(12) United States Patent
Cerna

(10) Patent No.: US 6,597,667 B1
(45) Date of Patent: Jul. 22, 2003

(54) NETWORK BASED MUTING OF A CELLULAR TELEPHONE

(75) Inventor: Pavel Cerna, Westminster, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/376,451

(22) Filed: Aug. 18, 1999

(51) Int. Cl.[7] .............................................. H04L 12/16
(52) U.S. Cl. ...................... 370/260; 370/261; 370/263; 455/550
(58) Field of Search ................................ 370/260, 261, 370/262, 263, 268, 269; 455/414, 416, 550, 174.1, 194.1; 379/202

(56) References Cited

U.S. PATENT DOCUMENTS

| 4,797,876 A | * | 1/1989 | Ratcliff ........................ 370/261 |
| 4,901,307 A | | 2/1990 | Gilhousen et al. |
| 5,103,459 A | | 4/1992 | Gilhousen et al. |
| 5,414,796 A | | 5/1995 | Jacobs et al. |
| 5,420,907 A | * | 5/1995 | Shapiro ........................ 379/38 |
| 5,504,773 A | | 4/1996 | Padovani et al. |
| 5,710,784 A | | 1/1998 | Kindred et al. |
| 5,724,416 A | | 3/1998 | Foladare et al. ............ 379/202 |
| 5,774,496 A | | 6/1998 | Butler et al. |
| 5,881,373 A | | 3/1999 | Elofsson et al. |
| 5,903,554 A | | 5/1999 | Saints |
| 5,950,122 A | * | 9/1999 | Foladare et al. ............. 455/414 |
| 5,995,827 A | * | 11/1999 | Gitlin et al. ................. 455/416 |
| 6,134,237 A | * | 10/2000 | Brailean et al. ............ 370/394 |
| 6,216,011 B1 | * | 4/2001 | Wierzbicki et al. ......... 455/550 |
| 6,226,513 B1 | * | 5/2001 | Wierzbicki et al. ......... 455/416 |

FOREIGN PATENT DOCUMENTS

| EP | 0918442 | 5/1999 |
| EP | 0989766 | 3/2000 |

* cited by examiner

Primary Examiner—Dang Ton
Assistant Examiner—Alexander Boakye
(74) Attorney, Agent, or Firm—Philip R. Wadsworth; Kent D. Baker; Sean English

(57) ABSTRACT

A system and method for selectively muting a call of a wireless communication system. A first predetermined signal is received by the wireless communication system. The phone signal has a user signal associated with it. In response to the first predetermined signal, the wireless communication system pauses communication of the user signal to the end user while still maintaining the phone call between the wireless communication system and the conference bridge. In response to a second predetermined signal, the wireless communication system reiates communication of the user signal to the end user.

28 Claims, 2 Drawing Sheets

NETWORK BASED MUTING OF A CELLULAR TELEPHONE

BACKGROUND OF THE INVENTION

1. Field of the Invention

The present invention relates to the field of telecommunications, and more particularly to muting transmissions from a cellular telephone.

2. Description of the Related Art

Conference bridging platforms allow multiple parties to be simultaneously connected to a telephone call in which the parties can hear and talk to each other even though they are geographically displaced at a variety of locations. The telephone call to which the parties are simultaneously connected is known as a conference call. Conference bridging platforms are typically operated by telecommunications carriers as part of a conferencing service. A party can participate in a conference call by calling the conferencing service and identifying the particular conference call to which the party wants to be connected. Before a party can participate in a conference call, arrangements ordinarily need to be made with the confddderencing service to set aside resources on the conference bridging platform to support the conference call as well as billing functions.

Problems can arise in using a typical conference bridging platform when one of the parties to a conference call is a cellular phone user. For example, problems arising in two different situations can have a detrimental effect on the other parties participating in the conference call. First, the cellular phone user is often in an environment with high ambient noise levels, such as taxicabs, airports, or restaurants. Consequently, the signal received at the bridging platform is likely to be very noisy. Second, the user may be operating from an area at the edge of a cell or other areas within the interior of a cell where the user's signal received at the base station is relatively noisy. In such situations, even if a party is not talking the signal received at the bridging platform may be very noisy because of the air link noise due to the poor link margin. These problems emanating from the operation of the cellular phone party can have a detrimental effect on the remaining parties participating in the conference call.

This detrimental effect arises because of the manner in which typical conference bridging platforms retransmit the signal received from one party to the remaining parties on the conference call. During the conference call, typically, a party can be heard by the other parties if the party's speech or sound level is the highest or the second (or maybe even the third) highest in comparison to the sound level of the other parties to the conference call. The party can be heard by the other parties because the conference bridging platform selects and rdddetransmits the signal which has the highest or second highest sound level to the remaining parties while the signals of the remaining parties are muted. This approach has the drawback of cellular phone conferees having loud or noisy connections, which often happens as described above, frequently dominating other conferees to the point where the latter are not heard by the noisy conferees.

This problem is pervasive and happens often whenever a cellular phone user is party to a conference call supported by a typical conference bridging platform. Foladare et al., U.S. Pat. No. 5,724,416, describes a conference bridging platform specifically designed to provide a solution to the dominating effect caused by conferees having loud or noisy connections. The invention of Foladare et al. resides in the conference bridging platform illustrated in FIG. 1 of U.S. Pat. No. 5,724,416. The platform includes a conventional conference bridging system, a plurality of noise adapters and a controller.

Subscribers access the conference bridge platform in a well-known manner by dialing a designated number. If the user of the cellular phone is in a high noise environment or an area of a cell with a poor link margin, such a user can avoid dominating the conference call by entering a predetermined touchtone or DTMF key, for example, the "#" key. The platform responds to entry of a touchtone "#" or other similar signal by muting the conference call branch in which the "#" was entered.

Alternatively, the platform responds to entry of a touchtone "#" or other similar signal by balancing the sound levels of the telephone calls participating in the conference call. Balancing is performed by the noise adapters and controller adjusting the threshold which a conferee's sound level must overcome in order for the conferee to participate the conference call. Balancing results in the threshold of less noisy conferees being lowered relative to the threshold of noisier conferees so that the less noisy conferees can participate in the conference call without having to raise their voices significantly.

Unfortunately, there are many conference bridging platforms in use which do not incorporate manual muting, e.g., the invention described in Foladare et al. These platforms perform adequately until a conference call includes a cellular phone party whose signal is noisy. In such a situation, for all conferees to be heard, conferees who are dominated by the louder connection of a cellular phone party must typically raise the volume of their voices significantly. Otherwise, the conferees will hear only the noise emanating from the cellular phone party's dominating connection. Consequently, there is still a need for improved conference bridging platform support of conference calls which include a cellular phone party whose signal is noisy. This invention meets this need.

In the current state of the art there are two methods that are currently contemplated for muting the transmissions of a cellular telephone. First, the microphone input can be disengaged from the speech encoder input. In the case of advanced vocoders, this prohibits the vocoder from being able to track changes in the background noise. In addition, the transmitter still transmits packets indicative of the silence. These packets may be erroneously decoded that can result in very disturbing noise effects. In variable rate vocoders, a rate determination error can cause a very disturbing effect.

A second method of muting a cellular phone would be to cause its transmission to temporarily cease. However, in an analog phone this would result in the disastrous consequence of the base station tracking pure noise and providing it to the end user. In digital systems this would cause the call to drop based on a lost reverse link. Both of these solutions are unsatisfactory. Thus, there is a need for a method of muting the transmissions of a cellular telephone in an effective manner.

SUMMARY OF THE INVENTION

The system and method of the present invention provide a simple, but effective, technique for allowing a user of a wireless communication device to mute the transmission from his cellular telephone. One particularly advantageous application of the present invention is to prevent the user's domination of a conference call being supported by a conference bridge accessed using a wireless communication system. The user's domination of the conference call results in the other conferee's of the conference call not being heard by the user and/or other conferees. This invention does not require modification of the conference bridge.

In addition, the present invention applies to calls to a speaker phone where a cellular user calling into a meeting room can use the present invention to prevent noise associated with the user's noisy environment, or noise inserted in the over-the-air interface from generating loud, disruptive audio at the meeting room.

An additional benefit of the present invention is that the protocol enhancement allows the user to achieve privacy, even on regular phone conversations. The electronic microphones at cellular phones are so sensitive, that covering the microphone with a hand does not ensure that the audio is muted. Since this is implemented at the infrastructure, the feature is available to all users of cell phones, since it is proposed using regular DTMF digits to turn the audio on/off.

In case of the cellular user operating on an analog cellular system, such as AMPS, there is high chance of a constant noise being added to the user's audio. This is improved in digital systems, such as CDMA systems, they are more resistant to the over-the-air noise, but they are not completely immune to such noise, and if the noise becomes significant, it can generate audio signal with very high energy. The invention addresses both of these sources of noise.

In one embodiment, the wireless communication system is capable of receiving a signal from the wireless communication device at the instruction of the user. In response to the received signal, the wireless communication system mutes the user's signal preventing the noise associated with the wireless communication device from reaching the conference bridge. The noise associated with the wireless communication device can include ambient noise at the device or air link noise between the device and the wireless communication system. This noise often results in the user of a wireless communication device dominating a conference call in which the user is participating.

Thus, a user of a wireless communication device can prevent the user's domination of a conference call by muting the user's signal at the wireless system. By muting the user's signal at the wireless system, this invention allows the wireless communication device user to prevent the user's domination of conference calls even if the user is using a conference bridge that does not, itself, prevent domination of conference calls.

DETAILED DESCRIPTION OF THE PREFERRED EMBODIMENT

Figure 1:
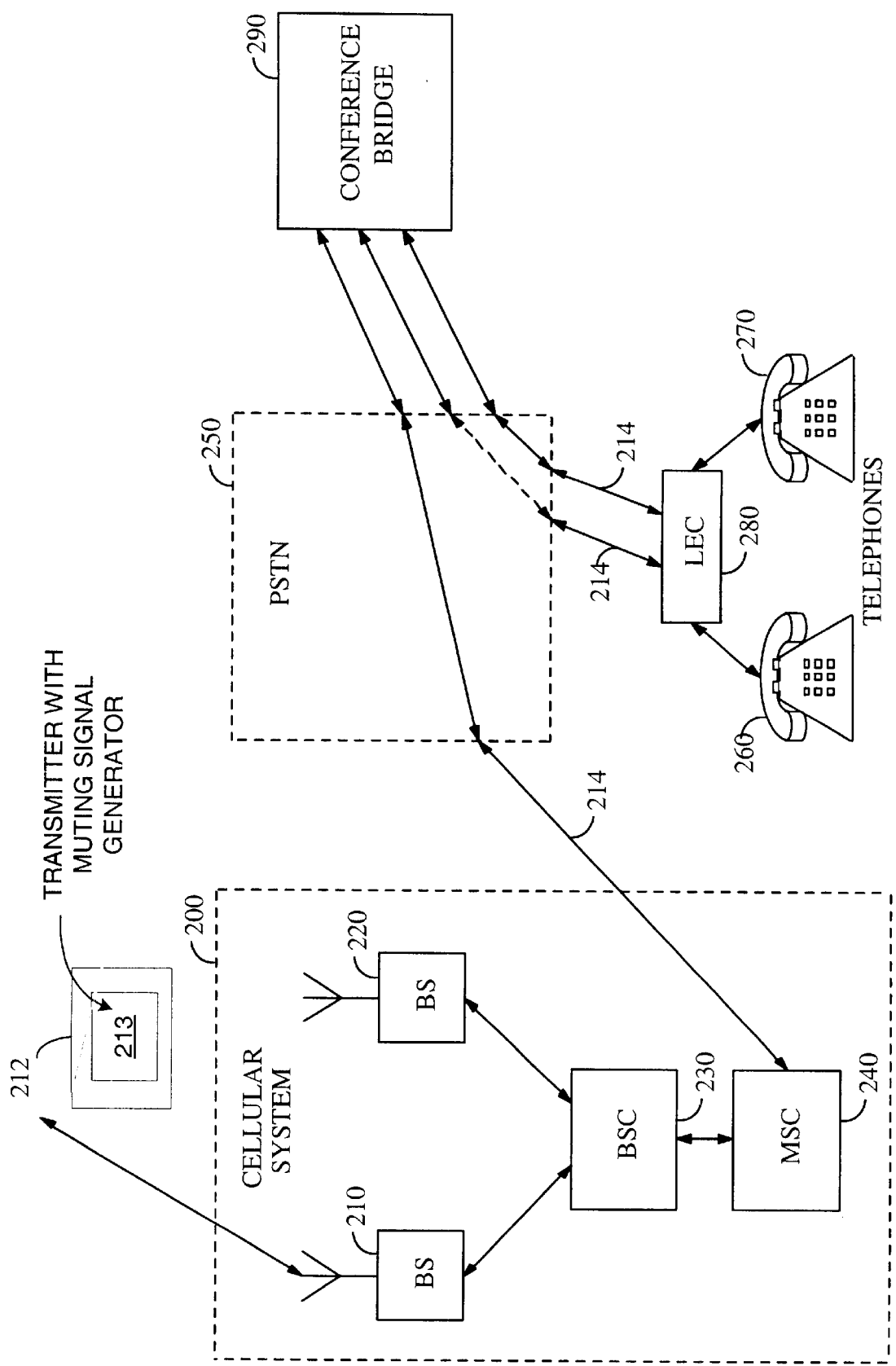
FIG. 1 is a block diagram of a wireless conference bridging system according to a presently preferred embodiment of the invention.

FIG. 1 shows a system block diagram of a wireless communications system (CS or System) 200 according to the presently preferred embodiment of the invention. In the exemplary embodiment, the present invention will be illustrated in its application to a conference call. However, the present invention describes a method of muting the transmission of a cellular telephone after the transmission has propagated through the air interface. This method of muting of a cellular telephone can be applied to any condition in which it is desirable to effectively mute the transmissions.

In one embodiment subscriber unit (SU) 212 includes a transmitter with muting signal generator 213. System 200 may include multiple base stations (BS) 210, 220 (only two shown) each of which can communicate wirelessly with [a subscriber unit (SU)] SU 212 when SU 212 is within the geographic area covered by the base station. System 200 also includes a base station controller (BSC) 230 and a mobile switching center. (MSC) 240. MSC 240 is connected to base stations 210, 220 through BSC 230. MSC 240 is connected to the public switched telephone network (PSTN) 250 through a line 214 of the telephone network 250. Lines 214 represent telephone connections within the telephone network 250 that are made to conference bridge 290. Telephones 260, 270 are connected to the conference bridge 290 through a local exchange carrier 280 and lines 214.

The general operation of SU 212, BS 210 or 220, BS 230, MSC 240 and PSTN 250 in a cellular system is well known in the art and need not be described in great detail here. Moreover, the operation of a typical conference bridge is well known and need not be described herein. A subscriber using SU 212 typically accesses a conference bridge 290 by dialing a designated telephone number provided by the conference bridge's conferencing service by entering the digits of the number into a keypad (not shown) of SU 212. Unlike a typical wired phone, the telephone number is keyed into the cellular phone "locally" before the request to initiate a call is made to the system 200. In a current embodiment, when the user presses a "send" button to "originate" the call, the SU 212 sends the stored digits to BS 210. BS 210 receives the digits and initiates a call set up process involving the BS 210, BSC 230, MSC 240 and PSTN 250. The successful completion of the call set up process results in the establishment of a phone call between SU 212 and the conference bridge 290.

The establishment of a phone call set up involves the allocation of resources in system 200 to permit the communication of signals from the user of. SU 212 to conference bridge 290 and from conference bridge 290 to the user of SU 212. BS 210 sends the request to set up a call received from SU 212 to BSC 230. BSC 230 contains a variety of subsystems (not shown) which manage communication between the various base stations in system 200 and communication between the MSC 240 and BS 210. For example, BSC 230 handles communications between base stations that are trying to transfer control of a subscriber unit from one base station to another base station in system 200. BSC 230 also handles communication between MSC 240 and BS 210. BSC 230 sends the request for call setup received from BS 210 to the MSC 240.

In response to the request for call set up, MSC 240, using the digits entered by the subscriber at SU 212, accesses the PSTN 250 in a well-known manner to set up the call. When the conference bridge responds, the voice connection is completed. To accommodate the data between SU 212 and BS 210, the BSC 230 will allocate a wireless traffic channel for carrying data between the SU 212 and the BS 210. The data being forwarded between SU 212 and BS 210 can be voice data or other types of data. Users of telephones 260, 270 access conference bridge 290 through their local exchange carrier (LEC) in a well-known manner.

IS System 200 can employ a variety of wireless communication schemes to effectuate provision of a telephone call by SU 212. For example, in various embodiments of this invention communication can be provided using code division multiple access (CDMA), time division multiple access (TDMA), or frequency division multiple access (FDMA). System 200 can be a cellular telephone system such as provided by personal communications services (PCS), advanced mobile phone system (AMPS), or global system for mobile (GSM) communications. Alternatively, System 200 can be a local wireless loop in which SU 212 is stationary or moves infrequently or relatively slowly between cells of the local wireless loop.

Figure 2:
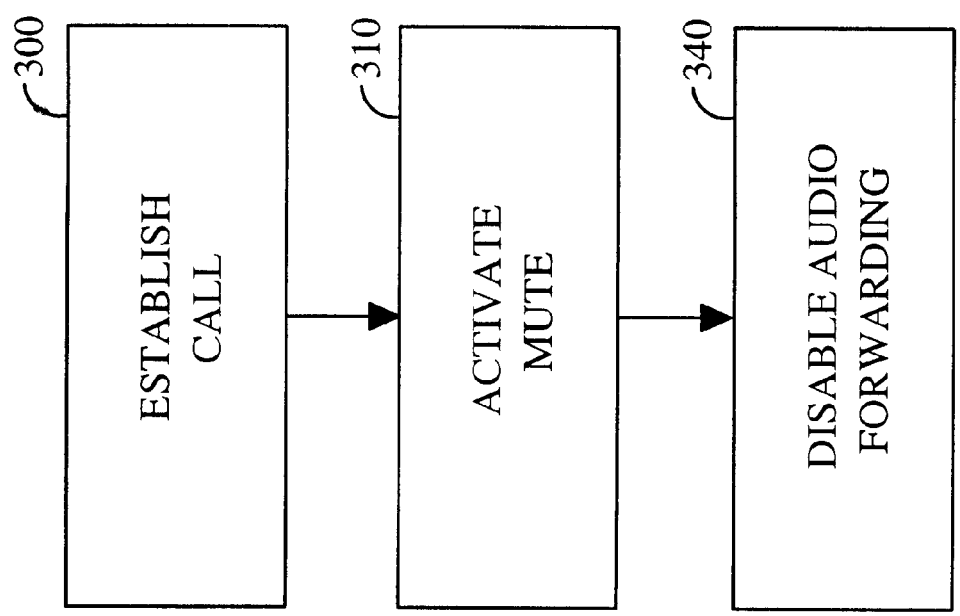
FIG. 2 is a diagram showing the operational flow of a wireless conference bridging system according to a presently preferred embodiment of the invention.

FIG. 2 shows a flow diagram showing the operation of system 200. At step 300, subscribers desiring a conference call each dial a designated telephone number to access the conference call service. The bridge requests specific information from the respective subscribers in a well-known manner, such as a personal identification number (PIN) and other information for establishing the conference call.

If the user of subscriber unit 212 in FIG. 1 is in a high noise environment, such as a restaurant or an airport or is in an area of the cell such that the air link to the BS 210 is very noisy, the user is likely to dominate the conference call in which the user is participating. To avoid dominating the conference call inappropriately, the user at subscriber unit 212 presses a predetermined MUTE key (e.g., a dedicated MUTE key or DTMF key such as '#') at step 310. The MUTE key allows the selective muting of a call by stopping and restarting the forwarding of at least some portion of the subscriber unit's user signal being transmitted by SU 212. The stopping and restarting of the forwarding of the user's signal can happen at BS 210, BSC 230, or MSC 240 in system 200, as described below. The stopping and restarting of the forwarding of the user's signal is performed in a conventional manner using hardware and/or software well known in the art and which can be found in BS 210, BSC 230 or MSC 240. Additionally, the operation of the hardware and/or software which achieves muting is conventional and need not be described in great detail here. For ease of reference the hardware and/or software which achieves muting is referred to as the muting unit. In an embodiment of this invention, the stopping and restarting of the forwarding of the user signal can be performed on an audio portion of the user signal. However, in alternative embodiments of the invention the stopping and forwarding can happen to other portions of the user signal.

In a system 200 which is digital, the stopping of the audio portion of the user signal includes replacing the digital data that carry the audio signal with digital data that would generate no significant audio signal when converted into an analog signal at the MSC 240. The restarting of the forwarding of the user signal stops the replacement of the digital data that carry the audio signal with digital data that generates no significant audio signal when converted into an analog signal at the MSC 240. By stopping the replacement of the digital data that carry the audio signal, the audio signal travels through system 200 such that the signal produced at MSC 240 is substantially a reproduction of the user signal produced at SU 212.

In one embodiment, the subscriber unit 212 is programmed to send a Mute message (or predetermined control signal) to the BS 210 in system (CS) 200 whenever the MUTE key is depressed. The present invention adds the Mute message to the message protocol associated with the communications scheme supported by system 200. Enhancement of the standard protocol to include an additional command message is well-known in the art.

If the Mute message is received by BS 210, BS 210 will maintain the phone call connection through MSC 240, PSTN 250 to the conference bridge 290. However, at step 340, the muting unit of BS 210 will stop forwarding the decoded audio portion of the signal received from the SU 212 to BSC 230. Upon receipt of the muting message, BS 210 ignores the received information data of the packet and sends a predetermined packet representative of silence to BSC 230.

Figure 3:
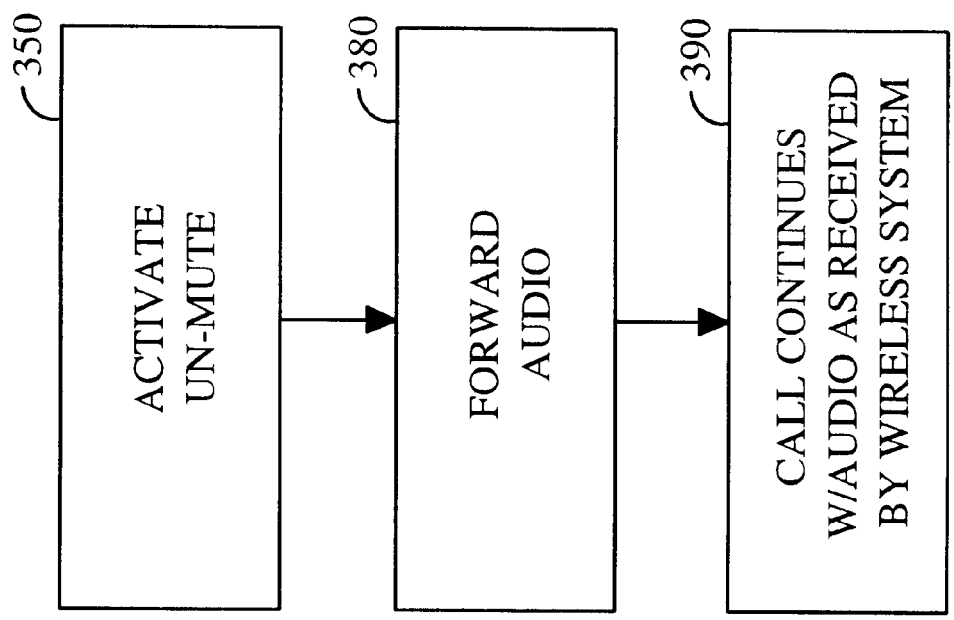
FIG. 3 is a diagram showing the operation flow of a wireless conference bridging system according to a presently preferred embodiment of the invention.

FIG. 3 shows a flow diagram showing the operation of system 200 when the MUTE key is depressed to restart forwarding of the audio portion of the signal received from the SU 212. If the user of SU 212 no longer wishes his transmission to be muted, the user depresses the MUTE key at step 350. As a result an un-Mute message is sent from the SU 212 to BS 210 of CS 200. At step 380, the muting unit of BS 210 will restart the forwarding of the audio portion of the signal received from the SU 212 to BSC 230. At step 390, the conference call continues with the audio received from SU 212 at system 200.

The foregoing description of a specific application is provided only as an example. There are several alternative embodiments that are in accordance with this invention. Two alternative embodiments arise from the choice of location within system 200 at which the muting unit is placed so as to achieve the stopping and restarting of the forwarding of the audio signal. In one embodiment, the stopping and the restarting of the forwarding of the audio portion of the signal received by the system 200 occurs at the BSC 230 rather than the BS 210. In such an embodiment, the muting unit of BSC 230, at step 340, on receipt of a Mute message forwarded by BS 210 will stop forwarding to MSC 240 the audio portion of the received signal. Additionally, in such an embodiment, the muting unit of BSC 230, on receipt of an un-Mute message, will restart, at step 380, the forwarding of the audio portion of the received signal to MSC 240.

In yet another alternative embodiment of this invention, the stopping and the restarting of the forwarding of the audio portion of the signal received by the system 200 can occur at the MSC 240 rather than the BSC 230. In such an embodiment, the muting unit of MSC 240, at step 340, on receipt of a Mute message forwarded by BSC 230 will stop forwarding to PSTN 250 the audio portion of the received signal. Additionally, in such an embodiment, the muting unit of MSC 240, at step 380, on receipt of an un-Mute message, will restart the forwarding of the audio portion of the received signal to PSTN 250.

There are even further alternative embodiments that are in accordance with this invention. The alternative embodiments arise from the various forms that a request for stopping and restarting the communication of the audio portion of the signal from the SU 212 can take. In an alternative embodiment in accordance with this invention, the subscriber at subscriber unit 212 can press a first predetermined sequence of DTMF keys at step 310. In response to the sequence of DTMF keys pressed by the subscriber, the SU 212 will either send the key sequence as a sequence of messages or as a sequence of tones. Sending the key sequence as a sequence of messages is preferable because of the error checking that is associated with the transmission of such messages.

For example, when a DTMF key is depressed in a typical CDMA system, a tone is not transmitted but rather a message according to the standard communication format is sent from the SU 212 to the system 200. At the system 200, receipt of the message caused by the depression of a DTMF key will cause the MSC 240 to generate a tone having the proper audio frequency components for transmission via the PSTN 250. Additionally, receipt at the system 200 of a sequence of messages caused by the depression of a sequence of keys can be identified by either the BS 210, BSC 230 or even the MSC 240 as an instruction to carry out a command.

Consequently, in an alternative embodiment in accordance with this invention, a sequence of messages caused by the depression, at step 310, of a first predetermined sequence of DTMF keys (or a single DTMF key), results in the BS 210 stopping, at step 340, the forwarding of the audio portion of the signal received from the SU 212. Additionally, the depression at step 350 of a second predetermined sequence of DTMF keys (or a single key) causes the BS 210 to restart, at step 380, the forwarding of the audio signal received from SU 212.

Alternatively, if the depression of a first predetermined sequence of DTMF keys (or a single key) results in a first sequence of dual tones (or a single DTMF dual tone) rather than a sequence of messages being sent at step 320, BS 210, at step 340, will stop audio forwarding. A depression by the user of SU 212 of a second predetermined sequence of DTMF keys (or single key) results in SU 212 sending a second sequence of tones (or a single DTMF dual tone) to BS 210. BS 210 may send an acknowledgement to SU 212 at step 370. At step 380, BS 210 restarts the forwarding of the audio signal received from SU 212. At step 390, the conference call continues with the audio as received by system 200 from SU 212.

The format of the messaging does not affect where in system 200 the stopping and restarting of the forwarding of the audio is performed. Regardless of whether the Mute and un-Mute messages are sent by the message protocol of system 200, DTMF message or DTMF tones, the stopping and restarting of the forwarding of the audio can be done at the BS 210, the BSC 230 or the MSC 240.

There are numerous benefits to this invention that are not found in prior art such as Foladare et al. For example, this invention allows the user of a wireless phone to mute his or her signal to prevent domination of a conference call even though the conference call employs existing conference bridge platforms that do not themselves incorporate a muting function similar to that described by Foladare et al. Thus, the invention would allow the continued use of numerous existing conference bridges not employing the invention of the prior art, thereby extending their useful lifespan.

Other benefits arising from this invention result from transmitting the Mute request as a signaling message of the communication protocol of the wireless communication system rather than as one or more tones. First, messages are heavily protected by error checking so that, even in relatively noisy air link environments, the bits comprising the message can be reconstructed from the received, corrupted bits, allowing the message to be correctly identified. The conference bridge of the prior art, is not likely to respond as well to a mute signal when a subscriber unit sends the mute signal as a DTMF tone in an environment having relatively high ambient noise or a noisy air link. DTMF tones can be corrupted by ambient noise or the air link noise to such an extent as to be unrecognizable when received by the conference bridging platform.

Second, by employing a message to execute the Mute request, the invention takes advantage of acknowledgements which are part of the messaging protocol. An acknowledgement is sent to the subscriber unit when the message is received by the base station, base station controller, or the mobile switching center Although the invention has been described in conjunction with particular embodiments, it will be appreciated that various modifications and alterations may be made by those skilled in the art without departing from the spirit and scope of the invention. The invention is not to be limited by the foregoing illustrative details, but rather is to be defined by the amended claims.

What is claimed is:

1. A method of selectively muting a user signal produced in a wireless communication device of a wireless communication system during a wireless phone call to a conference bridge, the method comprising:

activating a mute key on a wireless communication device;

receiving at the wireless communication system a first predetermined control signal from the wireless communication device;

stopping at the wireless communication system the communication of the user signal in response to activating the mute key;

wherein the first predetermined control signal is an error-checked signaling message in a communication protocol.

2. The method of claim 1 further comprising:

sending a first predetermined control signal from the wireless communication device to the wireless communication system; and wherein the stopping is in response to activating the mute key.

3. The method of claim 2, wherein the first predetermined control signal is sent from the wireless communication device to a base station in the wireless communication system.

4. The method of claim 3, wherein activating the mute key is performed by a user of the wireless communication device.

5. The method of claim 1 further comprising:

sending a second predetermined control signal from the wireless communication device to the wireless communication system; and restarting at the wireless communication system the communication of the user signal to the conference bridge in response to activating the mute key.

6. The method of claim 5, wherein the second predetermined control signal is sent from the wireless communication device to a base station in the wireless communication system.

7. The method of claim 1, wherein the first predetermined control signal is a DTMF signal received as a signaling message.

8. The method of claim 1, wherein the first predetermined control signal is at least one DTMF tone.

9. The method of claim 1, wherein the user signal is audio data.

10. The method of claim 1, wherein the user signal is analog audio data.

11. The method of claim 1, further comprising:

receiving a second predetermined control signal from the wireless device; and restarting at the wireless communication system the communication of the user signal to the conference bridge.

12. The method of claim 11, wherein the second predetermined control signal is a signaling message of a communication protocol.

13. The method of claim 11, wherein the second predetermined control signal is a DTMF sequence received as a signaling message having error checking.

14. The method of claim 11, wherein the second predetermined control signal is a DTMF tone sequence.

15. A call muting system for a wireless communication system comprising:

a muting signal generator; and a muting unit, wherein the muting unit mutes a telephone call set up by a wireless communication device in response to a first predetermined control signal generated by the muting signal generator, wherein the muting unit unmutes the telephone call set up by the wireless communication device in response to a second predetermined control signal received from the wireless communication device; and wherein the first predetermined control signal is an error-checked signaling message in a communication protocol.

16. The wireless communication system of claim 15 further comprising a base station; and wherein the muting unit resides in the base station.

17. The wireless communication system of claim 15 further comprising a base station controller; and wherein the muting unit resides in the base station controller.

18. The wireless communication system of claim 15 further comprising a mobile switching center; and wherein the muting unit resides in the mobile switching center.

19. The wireless communication system of claim 15, wherein the first predetermined control signal is an error-checked and acknowledged signaling message in a communication protocol.

20. The wireless communication system of claim 15, wherein the first predetermined control signal is a DTMF sequence received as a signaling message.

21. The wireless communication system of claim 15, wherein the first predetermined control signal is at least one DTMF tone.

22. The wireless communication system of claim 17, wherein the second predetermined control signal is a signaling message of a communication protocol.

23. The wireless communication system of claim 15, wherein the second predetermined control signal is a DTMF sequences received as a signaling message.

24. The wireless communication system of claim 15, wherein the second predetermined control signal is at least one DTMF tone.

25. A method of controlling noise in a wireless signal of a wireless communication device in communication with a conference bridge through a wireless system, the method comprising the steps of:

receiving a signal at the wireless system, the signal corresponding to a mute control signal from the wireless communication device; and employing the wireless system to prevent the noise in the wireless signal of the wireless communication device from reaching the conference bridge in response to the signal; and wherein the signal is an error-check signaling message in a communication protocol.

26. The method of claim 25 wherein the noise in the wireless signal is the ambient noise around the wireless communication device.

27. The method of claim 25 wherein the signal is received from the wireless communication device, and wherein the noise in the wireless signal is due to the air link noise between the wireless communication device and the wireless system.

28. The method of claim 25 wherein the step of employing comprises muting at the wireless system a user signal in the wireless signal;

wherein muting prevents the user signal from reaching the conference bridge in response to the signal; and wherein muting is performed in response to the signal.

* * * * *